United States Patent
Paul et al.

(10) Patent No.: US 11,578,157 B2
(45) Date of Patent: Feb. 14, 2023

(54) PROCESS FOR THE PRODUCTION OF ISOOLEFIN POLYMERS WITH IMPROVED INITIATOR SYSTEM PREPARATION

(71) Applicant: ARLANXEO DEUTSCHLAND GMBH, Dormagen (DE)

(72) Inventors: Hanns-Ingolf Paul, Leverkusen (DE); Rolf Feller, Solingen (DE); Udo Wiesner, Bornheim (DE); Carsten Kreuder, Sarnia (CA); Adam Gronowski, Sarnia (CA); Ricarda Leiberich, Neu-Isenburg (DE); Joachim Ritter, Leverkusen (DE)

(73) Assignee: ARLANXEO DEUTSCHLAND GMBH, Dormagen (DE)

(*) Notice: Subject to any disclaimer, the term of this patent is extended or adjusted under 35 U.S.C. 154(b) by 274 days.

(21) Appl. No.: 16/629,612

(22) PCT Filed: Jul. 6, 2018

(86) PCT No.: PCT/EP2018/068389
§ 371 (c)(1),
(2) Date: Jan. 9, 2020

(87) PCT Pub. No.: WO2019/011813
PCT Pub. Date: Jan. 17, 2019

(65) Prior Publication Data
US 2021/0139621 A1      May 13, 2021

(30) Foreign Application Priority Data
Jul. 12, 2017 (EP) .................................. 17180922

(51) Int. Cl.
*C08F 210/10* (2006.01)
*C08F 110/10* (2006.01)
*C08F 2/00* (2006.01)

(52) U.S. Cl.
CPC ........ *C08F 210/10* (2013.01); *C08F 2400/02* (2013.01)

(58) Field of Classification Search
USPC ............................................... 526/237, 348.7
See application file for complete search history.

(56) References Cited

U.S. PATENT DOCUMENTS

| 5,408,018 A * | 4/1995 | Rath ........................ C08F 10/10 |
|---|---|---|
| | | 526/210 |
| 2004/0059076 A1 | 3/2004 | Webb |
| 2004/0171772 A1 | 9/2004 | Huffer et al. |

FOREIGN PATENT DOCUMENTS

| CA | 1019095 A | 10/1977 |
|---|---|---|
| EP | 2132239 A1 | 12/2009 |
| JP | 2004-521164 A | 7/2004 |
| JP | 2004-526855 A | 9/2004 |
| JP | 2014-051543 A | 3/2014 |
| SU | 1807699 A1 | 4/1996 |
| WO | 01/36498 A1 | 5/2001 |
| WO | 2010/006983 A1 | 1/2010 |
| WO | 2011/000922 A1 | 1/2011 |
| WO | 2011/089092 A1 | 7/2011 |
| WO | 2012/045597 A1 | 2/2012 |
| WO | 2012/089823 A1 | 7/2012 |

OTHER PUBLICATIONS

International Search Report and Written Opinion, PCT Application No. PCT/EP2018/068389 dated Oct. 12, 2018.
International Preliminary Report on Patentability, PCT Application No. PCT/EP2018/068389 dated Jan. 14, 2020.
European Office Action dated Jan. 28, 2022, Application No. 18 738 295.7.
Chinese Office Action dated Feb. 7, 2022, Application No. 201880059053.7.

* cited by examiner

*Primary Examiner* — Fred M Teskin
(74) *Attorney, Agent, or Firm* — The Dobrusin Law Firm, P.C.

(57) ABSTRACT

The invention relates to an efficient process for the preparation of isoolefin polymers such as polyisobutene or butyl rubber by polymerization of isobutene and optionally further monomers in the presence of an initiator system prepared by continuously contacting at least one boron or aluminium compound and at least one initiator.

20 Claims, No Drawings

PROCESS FOR THE PRODUCTION OF ISOOLEFIN POLYMERS WITH IMPROVED INITIATOR SYSTEM PREPARATION

FIELD OF THE INVENTION

The invention relates to an efficient process for the preparation of isoolefin polymers such as polyisobutene or butyl rubber by polymerization of isobutene and optionally further monomers in the presence of an initiator system prepared by continuously contacting at least one boron or aluminium compound and at least one initiator

Background

Polymers containing repeating units derived from isoolefins are industrially prepared by carbocationic polymerization processes. Of particular importance are polyisobutene and butyl rubber which is a copolymer of isobutylene and a smaller amount of a multiolefin such as isoprene.

The carbocationic polymerization of isoolefins and its copolymerization with multiolefins is mechanistically complex. The initiator system is typically composed of two components: an a Lewis acid such as aluminum trichloride which is frequently employed in large scale commercial processes and an initiator.

Examples of initiators include proton sources such as hydrogen halides, alcohols, phenols, carboxylic and sulfonic acids and water.

During the initiation step, the isoolefin reacts with an initiator system comprising a Lewis acid in particular a boron or aluminium compound and the initiator to produce a carbenium ion which further reacts with a monomer forming a new carbenium ion in the so-called propagation step.

The type of monomers, the type of diluent or solvent and its polarity, the polymerization temperature as well as the specific combination of Lewis acid and initiator affects the chemistry of propagation and thus monomer incorporation into the growing polymer chain.

Industry has generally accepted widespread use of a slurry polymerization process to produce polyisobutylene, butyl rubber and further isoolefin polymers in methyl chloride as diluent. Typically, the polymerization process is carried out at low temperatures, generally lower than −90° C. Alkyl chlorides, in particular methyl chloride are employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers.

Alternatively, aliphatic solvents like normal and iso pentanes and hexanes as well as mixtures thereof are used for polymerization as for examples disclosed in WO2010/006983A and WO2011/089092A which have significant advantages in the downstream processing e.g. chemical modification of the polymer.

The isoolefin polymer e.g. polyisobutene or butyl rubber prepared during polymerization is dissolved in these aliphatic media and so these processes are normally referred to as a solution processes.

A common feature of both, slurry and solution processes is that due to the high but typically hardly predictable reactivity of the initiator system temperature control and the avoidance of so called "hot spots" due to inhomogenities of the polymerization medium is difficult but crucial to achieve a desired product quality and to avoid reactor fouling, i.e. the formation of deposits of polymers on the surfaces of the reactor. Such deposits, due to their insulating effect, reduce cooling efficiency and may cause a rapid rise of temperature within the reactor thereby increasing the rate of the exothermic polymerization and fast production of further heat which is again insufficiently removed. Finally, this may even lead to a thermal runaway.

It is known that even slight variations in the preparation of the initiator system can lead to significantly different reactivity (see for example WO2012/45597A). Typical parameters are amount and type of lewis acid and initiator, temperature, dosing regime and residence time before usage.

To allow reproducibility and to reduce large variations in initiator system reactivity in continuous polymerizations to produce polyisobutene or butyl rubber the initiator is typically produced batchwise in larger quantities before its employment in the polymerization reaction.

CA 1,019,095 A discloses preparation of an initiator system by activating ethylaluminum sesquichloride dissolved in benzene and isopentane with moisturized nitrogen i.e. water as initiator in a batch reaction over 6.5 h in a closed circuit at 5° C. and at a 500 l scale.

SU 1 807 699 A discloses preparation of a similar initiator system by activating ethylaluminum sesquichloride dissolved in gasoline and isopentane with water as initiator in a humidifier at 5° C.

In both documents the molar ratio of ethylaluminum sesquichloride to water was chosen to be 1:0.9.

However, these attempts are not reproducible enough to satisfy commercial large scale production.

Therefore, there still remained the need for providing a versatile process for the preparation of high quality isoolefin polymers with superior process control

SUMMARY OF THE INVENTION

According to one aspect of the invention, there is now provided a process for the preparation of isoolefin polymers, the process comprising at least the step of:
a) providing a reaction medium comprising an organic diluent, at least one monomer being an isoolefin and an initiator system prepared by contacting
at least one boron or aluminium compound and
at least one initiator and
b) polymerizing the at least one monomer within the reaction medium in the presence of the initiator system to form a product medium comprising the isoolefin polymer, the organic diluent and optionally residual monomer(s),
whereby the initiator system is formed by continuously contacting at least one boron or aluminium compound and the at least one initiator.

DETAILED DESCRIPTION OF THE INVENTION

The invention also encompasses all combinations preferred embodiments, ranges parameters as disclosed hereinafter with either each other or with the broadest disclosed range or parameter.

Isoolefins and Other Monomers

In step a) a reaction medium comprising an organic diluent, at least one monomer being an isoolefin and an initiator system is provided.

As used herein the term isoolefin denotes compounds comprising one carbon-carbon-double-bond, wherein one carbon-atom of the double-bond is substituted by two alkyl-groups and the other carbon atom is substituted by two hydrogen atoms or by one hydrogen atom and one alkyl-group.

Examples of suitable isoolefins include isoolefins having from 4 to 16 carbon atoms, preferably 4 to 7 carbon atoms, such as isobutene, 2-methyl-1-butene, 3-methyl-1-butene, 2-methyl-2-butene. A preferred isolefin is isobutene.

The reaction medium may comprise further monomers that are copolymerized with the at least one isoolefin. Such further monomers include multiolefins.

As used herein the term multiolefin denotes compounds comprising more than one carbon-carbon-double-bond, either conjugated or non-conjugated.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The reaction medium may additionally or alternatively comprise further monomers that are copolymerized with the at least one isoolefin and are neither isoolefins nor multiolefins. Such further monomers include β-pinene, styrene, divinylbenzene, diisopropenylbenzene o-, m- and p-alkylstyrenes such as o-, m- and p-methyl-styrene.

In one embodiment isobutene is used as sole monomer, whereby the term "sole" as used herein denotes a fraction of 99.9 wt.-% or more of all monomers employed.

In another embodiment, the monomers employed in step a) may comprise in the range of from 80 wt.-% to 99.5 wt.-%, preferably of from 85 wt.-% to 98.0 wt.-%, more preferably of from 85 wt.-% to 96.5 wt.-%, even more preferably of from 85 wt.-% to 95.0 wt.-%, by weight of at least one isoolefin and in the range of from 0.5 wt.-% to 20 wt.-%, preferably of from 2.0 wt.-% to 15 wt.-%, more preferably of from 3.5 wt.-% to 15 wt.-%, and yet even more preferably of from 5.0 wt.-% to 15 wt.-% by weight of at least one multiolefin based on the weight sum of all monomers employed.

In another embodiment the monomer mixture comprises in the range of from 90 wt.-% to 95 wt.-% of at least one isoolefin and in the range of from 5 wt.-% to 10 wt.-% by weight of a multiolefin based on the weight sum of all monomers employed. Yet more preferably, the monomer mixture comprises in the range of from 92 wt.-% to 94 wt.-% of at least one isoolefin and in the range of from 6 wt.-% to 8 wt.-% by weight of at least one multiolefin monomer based on the weight sum of all monomers employed. The isoolefin is preferably isobutene and the multiolefin is preferably isoprene.

Where at least one multiolefin is employed in the reaction medium the multiolefin content of the final copolymers produced are typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

In another embodiment the multiolefin content of copolymers produced according to the invention is 0.1 mol-% or more, preferably of from 0.1 mol-% to 3 mol-%, particularly where isobutene and isoprene are employed.

In one embodiment the monomers are purified before use in step a), in particular when they are recycled from optional step c). Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis.

Organic Diluents

The term organic diluent encompasses diluting or dissolving organic chemicals which are liquid under reactions conditions. Any suitable organic diluent may be used which does not or not to any appreciable extent react with monomers or components of the initiator system.

However, those skilled in the art are aware of potential interactions between the diluent and monomers or components of the initiator system.

Additionally, the term organic diluent includes mixtures of at least two diluents.

Examples of organic diluents include hydrochlorocarbon(s) such as methyl chloride, methylene chloride or ethyl chloride.

Further examples of organic diluents include hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integer figures and at least with the value one.

In one embodiment the hydrofluorocarbon(s) is/are selected from the group consisting of saturated hydrofluorocarbons such as fluoromethane; difluoromethane; trifluoromethane; fluoroethane; 1,1-difluoroethane; 1,2-difluoroethane; 1,1,1-trifluoroethane; 1,1-, 2-trifluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4- pentafluorobutane; 1,1,1,4-pentafluorobutane; 1,1,2,2,3-pentafluorobutane; 1,1,2,2,4-pentafluorobutane; 1,1,2,3,3-pentafluorobutane; 1,1,2,3,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane;

Particularly preferred HFC's include difluoromethane, trifluoromethane, 1,1-difluoroethane, 1,1,1-trifluoroethane, fluoromethane, and 1,1,1,2-tetrafluoroethane.

In one further embodiment the hydrofluorocarbon(s) is/are selected from the group consisting of unsaturated hydrofluorocarbons such as vinyl fluoride; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 2,3,3,3-tetrafluoro-1-propene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,2,3,4,4-heptafluoro-2-butene; 1,1,1,2,4,4,4-heptafluoro-2-butene; and mixtures thereof.

Further examples of organic diluents include hydrochlorofluorocarbons.

Further examples of organic diluents include hydrocarbons, preferably alkanes which in a further preferred embodiment are those selected from the group consisting of n-butane, isobutane, n-pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, nonane, decane, dodecane, undecane, hexane, methyl cyclohexane, cyclopentane, methylcyclopentane, 1,1-dimethylcycopentane, cis-1,2-dimethylcyclopentane, trans-1,2-dimethylcyclopentane, trans-1,3-dimethyl-cyclopentane, ethylcyclopentane, cyclohexane, methylcyclohexane.

Further examples of hydrocarbon diluents include benzene, toluene, xylene, ortho-xylene, para-xylene and meta-xylene.

Suitable organic diluents further include mixtures of at least two compounds selected from the groups of hydrochlorocarbons, hydrofluorocarbons, hydrochlorofluorocarbons and hydrocarbons. Specific combinations include mixtures of hydrochlorocarbons and hydrofluorocarbons such as mixtures of methyl chloride and 1,1,1,2-tetrafluoroethane, in particular those of 40 to 60 vol.-% methyl chloride and 40 to 60 vol.-% 1,1,1,2-tetrafluoroethane whereby the aforementioned two diluents add up to 90 to 100 vol.-%, preferably to 95 to 100 vol. % of the total diluent, whereby the potential remainder to 100 vol. % includes other halogenated hydrocarbons; or mixtures of methyl chloride and at least one alkane or mixtures of alkanes such as mixtures comprising at least 90 wt.-%, preferably 95 wt.-% of alkanes having a boiling point at a pressure of 1013 hPa of −5° C. to 100° C. or in another embodiment 35° C. to 85° C. In another embodiment least 99.9 wt.-%, preferably 100 wt.-% of the alkanes have a boiling point at a pressure of 1013 hPa of 100° C. or less, preferably in the range of from 35 to 100° C., more preferably 90° C. or less, even more preferably in the range of from 35 to 90° C.

Depending on the nature of the polymerization intended for step b) the organic diluent is selected to allow a slurry polymerization or a solution polymerization.

Initiator System

The monomer(s) within the reaction medium are polymerized in the presence of an initiator system to form a product medium comprising the isoolefin polymer, the organic diluent and optionally residual monomer(s).

The initiator system is prepared by reacting
at least one boron or aluminium compound and
at least one initiator Suitable one boron or aluminium compounds are those represented by formula $MX_3$, where M is boron or aluminum and X is a halogen. Examples for such compounds include aluminum trichloride, aluminum tribromide, boron trifluoride, boron trichloride and boron tribromide, whereby aluminum trichloride is preferred.

Further suitable boron or aluminium compounds are those represented by formula $MR_{(m)}X_{(3-m)}$, where M is boron or aluminum, X is a halogen, R is a monovalent hydrocarbon radical selected from the group consisting of $C_1$-$C_{12}$ alkyl and $C_7$-$C_{14}$ alkylaryl radicals; and m is one or two. The term "alkylaryl" refers to a radical containing both aliphatic and aromatic structures, the radical being at an aliphatic position.

Examples for such compounds include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, isobutyl aluminum dichloride and diisobutyl aluminum chloride.

Preferred are diisobutyl aluminum chloride (iBu$_2$AlCl or iBuAC), isobutyl aluminum sesquichloride (iBu$_{1.5}$AlCl$_{1.5}$ or iBuSC), isobutyl aluminum dichloride (iBuAlCl$_2$ or iBuADC), diethyl aluminum chloride (Et$_2$AlCl or DEAC), ethyl aluminum sesquichloride (Et$_{1.5}$AlCl$_{1.5}$ or EASC), ethyl aluminum dichloride (EtAlCl$_2$ or EADC), diethyl aluminum bromide (Et$_2$AlBr or DEAB), ethyl aluminum sesquibromide (Et$_{1.5}$AlBr$_{1.5}$ or EASB) and ethyl aluminum dibromide (EtAlBr$_2$ or EADB).

A particularly preferred aluminum compound is ethyl aluminum sesquichloride (Et$_{1.5}$AlCl$_{1.5}$ or EASC).

The at least one initiator is selected from those being capable of reacting with the chosen boron or aluminum compounds to yield a complex which reacts with the monomers thereby forming a propagating polymer chain.

In a preferred embodiment such initiators are selected from the group consisting of water, alcohols, phenols, hydrogen halides, carboxylic acids, carboxylic acid halides, carboxylic acid esters, carboxylic acid amides, sulfonic acids, sulfonic acid halides, alkyl halides, alkylaryl halides and polymeric halides.

Preferred alcohols include methanol, ethanol, propanol, 2-propanol, 2-methylpropan-2-ol, cyclohexanol, and benzyl alcohol.

Preferred phenols include phenol; 2-methylphenol; 2,6-dimethylphenol; p-chlorophenol; p-fluorophenol; 2,3,4,5,6-pentafluorophenol; and 2-hydroxynaphthalene.

Preferred hydrogen halides include hydrogen chloride, hydrogen bromide and hydrogen iodide. A particularly preferred hydrogen halide is hydrogen chloride.

Preferred carboxylic acids include both aliphatic and aromatic carboxylic acids. Examples of carboxylic acids useful in this invention include acetic acid, propanoic acid, butanoic acid; cinnamic acid, benzoic acid, 1-chloroacetic acid, dichloroacetic acid, trichloroacetic acid, trifluoroacetic acid, p-chlorobenzoic acid, and p-fluorobenzoic acid. Particularly preferred carboxylic acids include trichloroacetic acid, trifluoroacteic acid, and p-fluorobenzoic acid. Carboxylic acid halides useful in this invention are similar in structure to carboxylic acids with the substitution of a halide for the OH of the acid. The halide may be fluoride, chloride, bromide, or iodide, with the chloride being preferred.

Carboxylic acid halides useful in this invention include acetyl chloride, acetyl bromide, cinnamyl chloride, benzoyl chloride, benzoyl bromide, trichloroacetyl chloride, trifluoroacetylchloride, trifluoroacetyl chloride and p-fluorobenzoylchloride. Particularly preferred acid halides include acetyl chloride, acetyl bromide, trichloroacetyl chloride, trifluoroacetyl chloride and p-fluorobenzoyl chloride.

Carboxylic acid esters include methyl acetate, ethyl acetate, vinyl acetate, propyl acetate, allyl acetate, benzyl acetate, methyl acrylate, ethyl acrylate, propyl acrylate, butyl acrylate, methyl methacrylate, ethyl methacrylate, propyl methacrylate, butyl methacrylate, dimethyl maleate, diethyl maleate, dipropyl maleate, methyl benzoate, ethyl benzoate, propyl benzoate, butyl benzoate, allyl benzoate, butylidene benzoate, benzyl benzoate, phenylethyl benzoate, dimethyl phthalate, diethyl phthalate, dipropyl phthalate, dibutyl phthalate, dipentyl phthalate, dihexyl phthalate, diheptyl phthalate and dioctyl phthalate.

Carboxylic acid amides include N,N-dimethyl formamide, N,N-dimethyl acetamide, N,N-diethyl formamide and N,N-diethyl acetamide. Preferred tertiary alkyl and aralkyl initiators include tertiary compounds represented by the formula below: wherein X is a halogen, pseudohalogen, ether, or ester, or a mixture thereof, preferably a halogen, preferably chloride and $R_1$, $R_2$ and $R_3$ are independently any linear, cyclic or branched chain alkyls, aryls or arylalkyls, preferably containing 1 to 15 carbon atoms and more preferably 1 to 8 carbon atoms. n is the number of initiator sites and is a number greater than or equal to 1, preferably between 1 to 30, more preferably n is a number from 1 to 6. The arylalkyls may be substituted or unsubstituted. For the purposes of this invention and any claims thereto, arylalkyl is defined to mean a compound containing both aromatic and aliphatic structures. Preferred examples of initiators include 2-chloro-2,4,4-trimethylpentane; 2-bromo-2,4,4-trimethylpentane; 2-chloro-2-methylpropane; 2-bromo-2-methylpropane; 2-chloro-2,4,4,6,6-pentamethylheptane; 2-bromo-2,4,4,6,6-pentamethylheptane; 1-chloro-1-methylethylbenzene; 1-chloroadamantane; 1-chloroethylbenzene; 1, 4-bis(1-chloro-1-methylethyl) benzene; 5-tert-butyl-1,3-bis(1-chloro-1-methylethyl) benzene; 2-acetoxy-2,4,4-trimethylpentane; 2-benzoyloxy-2,4,4-trimethylpentane; 2-acetoxy-2-methylpropane; 2-benzoyloxy-2-methylpropane; 2-acetoxy-2,4,4,6,6-pentamethylheptane; 2-benzoyl-2,4,4,6,6-pentamethylheptane; 1-acetoxy-1-methylethylbenzene; 1-aceotxyadamantane; 1-benzoyloxyethylbenzene; 1,4-bis(1-acetoxy-1-methylethyl) benzene; 5-tert-butyl-1,3-bis(1-acetoxy-1-methylethyl) benzene; 2-methoxy-2,4,4-trimethylpentane; 2-isopropoxy-2,4,4-trimethylpentane; 2-methoxy-2-methylpropane; 2-benzyloxy-2-methylpropane; 2-methoxy-2,4,4,6,6-pentamethylheptane; 2-isopropoxy-2,4,4,6,6-pentamethylheptane; 1-methoxy-1- methylethylbenzene; 1-methoxyadamantane; 1-methoxyethylbenzene; 1,4-bis(1-methoxy-1-methylethyl) benzene; 5-tert-butyl-1,3-bis(1-methoxy-1-methylethyl) benzene and 1,3,5-tris(1-chloro-1-methylethyl) benzene.

Sulfonic acids useful as initiators in this invention include both aliphatic and aromatic sulfonic acids. Examples of preferred sulfonic acids include methanesulfonic acid, trifluoromethanesulfonic acid, trichloromethanesulfonic acid and p-toluenesulfonic acid.

Sulfonic acid halides useful in this invention are similar in structure to sulfonic acids with the substitution of a halide for the OH of the parent acid. The halide may be fluoride, chloride, bromide or iodide, with the chloride being preferred. Preparation of the sulfonic acid halides from the parent sulfonic acids are known in the prior art and one skilled in the art should be familiar with these procedures. Preferred sulfonic acid halides useful in this invention include methanesulfonyl chloride, methanesulfonyl bromide, trichloromethanesulfonyl chloride, trifluoromethanesulfonyl chloride and p-toluenesulfonyl chloride.

Alkyl halides useful in this invention include 2-chloro-2, 4,4-trimethylpentane and 2-chloro-2-methylpropane.

Alkylaryl halides useful in this invention include 1-chloro-1-methylethylbenzene.

Polymeric halides useful in this invention include those having at least two halogenated tertiary carbons positioned at the chain end or along or within the backbone of the polymer.

Preferred initiators are selected from the group consisting of water, methanol, ethanol, hydrogen chloride, hydrogen bromide and 2-chloro-2-methylpropane, whereby water, methanol and hydrogen chloride are more preferred and water is even more preferred.

A preferred molar ratio of initiator to the sum of boron and aluminum atoms of the boron or aluminum compounds employed is generally from 0.005 to 1.900 preferably from 0.500 to 1.500, more preferably from 0.800 to 1.1.200 and even more preferably from 0.900 to 1.050.

The initiator system comprising the at least one boron or aluminum compound and the at least one initiator is preferably present in the reaction mixture in an amount of 0.002 to 5.0 wt.-%, preferably of 0.1 to 0.5 wt.-%, based on the weight of the monomers employed.

In another embodiment, in particular where aluminum trichloride is employed the wt.-ratio of monomers employed to boron or aluminum compounds, in particular aluminum trichloride is within a range of 500 to 20000, preferably 1500 to 10000.

In a particularly preferred initiator system, the boron or aluminum compound is ethyl aluminum sesquichloride, preferably generated by mixing equimolar amounts of diethyl aluminum chloride and ethyl aluminum dichloride, and the initiator is water.

In one embodiment, where aluminum halides, in particular aluminum trichloride are employed as boron or aluminum compound water and/or alcohols, preferably water is used as initiator.

According to the invention the initiator system is formed by continuously contacting at least one boron or aluminium compound and the at least one initiator.

This may occur for example by continuously contacting respective solutions of boron or aluminium compounds with solutions of the chosen initiator(s) or gas streams comprising or consisting of the respective initiator(s).

To ensure reproducibility it is preferred to continuously contact solutions of boron or aluminium compounds with known concentrations with solutions of the chosen initiator(s) with known concentration or gas streams comprising or consisting of the respective initiator(s) with known partial pressure of the initiator(s).

The solutions are preferably prepared using the organic diluents disclosed above, whereby the hydrocarbons in particular the alkanes mentioned above are preferred. One skilled in the art is aware which organic diluent is suitable to prepare solutions of boron or aluminium compounds or the initiators.

Where water is employed as initiator it can be employed eg as solution in n-hexane or a mixture of hexanes with a concentration of e.g. 100 ppm by weight.

If gas streams are preferred the initiators can either be evaporated of a stream of a carrier gas that is inert or virtually inert under the polymerization conditions can be used to be enriched with the initiator. Suitable carrier cases that are inert or virtually inert under the polymerization conditions are for example nitrogen, argon and other noble gases. The chosen initiator, depending on temperature and its boiling point, may be present in the gas stream in a broad range of partial pressure, whereby those skilled in the art have no difficulties to determine the ideal conditions.

The continuous preparation of the initiator system can be made in any suitable vessel known to those skilled in the art for that purpose (see also section entitled polymerization conditions below).

Where water is employed as initiator in one embodiment the carrier gas is contacted with liquid water long enough to achieve at least 50%, preferably 80% of water saturation of the gas stream at given temperature. For example at 20° C. the partial pressure of water is 23.4 hPa.

A further feature that typically has an influence on reactivity is the residence time. The residence time denotes the time between continuously contacting the aluminum or boron compound(s) with the initiator to form the initiator system and contacting said initiator system within the reaction medium with at least one monomer being an isoolefin.

In one embodiment the initiator system is formed continuously simultaneously with providing the reaction medium in step a). Then the residence time is 0 s. This might e.g. be effected by feeding a suitable polymerization reactor continuously and simultaneously with a stream of organic diluent and the monomer(s), a stream of a solution of the aluminium and boron compound(s) and a stream of a solution of initiator(s) or a gas stream comprising or consisting of the initiator(s).

In another embodiment the initiator system is formed continuously before the reaction medium in step a) is provided. Then the residence time is >0 s, preferably from 1 s to 24 h, more preferably from 5 s to 30 min and even more preferably from 5 s to 20 min.

This embodiment might e.g. be worked by feeding a suitable polymerization reactor with a stream of organic diluent and the monomer(s), and a stream of the initiator system in an organic diluent as disclosed above. In this embodiment the initiator system is continuously provided to form the reaction medium in step a)

The initiator system as prepared according to the invention is also encompassed by the invention whether in combination with a organic diluent or not.

The Reaction Medium

The monomer(s) may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-%, or in another embodiment of from 10.0 wt.-% to 40.0 wt.-%.

The organic diluent may be present in the reaction medium in an amount of from 0.01 wt.-% to 80 wt.-%, preferably of from 0.1 wt.-% to 65 wt.-%, more preferably of from 10.0 wt.-% to 65.0 wt.-% and even more preferably of from 25.0 wt.-% to 65.0 wt.-%, or in another embodiment of from 10.0 wt.-% to 40.0 wt.-%.

The amounts of organic diluent, the monomers and the initiator system are selected such that they make up at least 95 wt.-%, preferably 97 to 100 wt.-% and more preferably 99 to 100 wt. % of the reaction medium employed in step b).

The remainder to 100%, if present, may comprise other organic or inorganic compounds, preferably those virtually not affecting the polymerization reaction.

Polymerization Conditions

In one embodiment, the organic diluent and the monomers employed are substantially free of water. As used herein substantially free of water is defined as less than 30 ppm based upon total weight of the reaction medium, preferably less than 20 ppm, more preferably less than 10 ppm, even more preferably less than 5 ppm, and most preferably less than 1 ppm.

One skilled of the art is aware that the water content in the diluent and the monomers needs to be low to ensure that the initiator system is not affected by additional amounts of water which are not added by purpose e.g. to serve as an initiator.

Steps a) and b) may each be carried out in continuous or batch processes, whereby a continuous operation is preferred. Typically provision of a reaction medium in step a) and initiation of the polymerization in b) are realized simultaneously.

In an embodiment of the invention the polymerization according to step b) is effected using a polymerization reactor. Suitable reactors are those known to the skilled in the art and include flow-through polymerization reactors, plug flow reactor, stirred tank reactors, moving belt or drum reactors, jet or nozzle reactors, tubular reactors, and autorefrigerated boiling-pool reactors. Specific suitable examples are disclosed in WO 2011/000922 A and WO 2012/089823 A. Depending on the choice of the organic diluent the polymerization according to step b) is carried out either as slurry polymerization or solution polymerization.

In slurry polymerization, the monomers, the initiator system are all typically soluble in the diluent or diluent mixture, i.e., constitute a single phase, while the copolymer upon formation precipitates from the organic diluent. Desirably, reduced or no polymer "swelling" is exhibited as indicated by little or no Tg suppression of the polymer and/or little or no organic diluent mass uptake.

In solution polymerization, the monomers, the initiator system are all typically soluble in the diluent or diluent mixture, i.e., constitute a single phase as is the copolymer formed during polymerization.

The solubilities of the desired polymers in the organic diluents described above as well as their swelling behaviour under reaction conditions is well known to those skilled in the art.

The advantages and disadvantages of solution versus slurry polymerization are exhaustively discussed in the literature and thus are also known to those skilled in the art.

Step b) is preferably carried out as solution process.

In one embodiment step b) is carried out at a temperature in the range of −100° C. to −60° C., preferably in the range of −96° C. to −80° C. and even more preferably in the range of −95° C. to −85° C.

The reaction pressure in step b) is typically from 500 to 100,000 hP, preferably from 1100 to 20,000 hPa, more preferably from 1300 to 5,000 hPa.

Where the polymerization according to step b) is carried out as a slurry process the solids content of the slurry in step b) is preferably in the range of from 1 to 45 wt.-%, more preferably 3 to 40 wt.-%, even more preferably 15 to 40 wt.-%.

As used herein the terms "solids content" or "solids level" refer to weight percent of the isoolefin polymer in the product medium comprising the isoolefin polymer, the organic diluent and optionally residual monomer(s) obtained according to step b).

In one embodiment the reaction time in step b) is from 2 min to 2 h, preferably from 10 min to 1 h and more preferably from 20 to 45 min.

The process according to steps a) and b) may be carried out batchwise or continuously. Where a continuous reaction is performed the reaction time given above represents the average residence time of polymerization.

In one embodiment the reaction is stopped by quenching agents for example a 1 wt.-% sodium hydroxide solution in water, methanol or ethanol.

In another embodiment, the reaction is quenched by the contact with the aqueous medium in step c), which in one embodiment may have a pH value of 5 to 10, preferably 6 to 9 and more preferably 7 to 9 measured at 20° C. and 1013 hPa.

The pH-adjustment where desired may be performed by addition of acids or alkaline compounds which preferably do not contain multivalent metal ions. pH adjustment to higher pH values is e.g. effected by addition of sodium or potassium hydroxide.

In particular for solution polymerizations the conversion is typically stopped after a monomer consumption of from 5 wt.-% to 25 wt.-%, preferably 10 wt.-% to 20 wt.-% of the initially employed monomers.

Monomer conversion can be tracked by online viscometry or spectroscopic monitoring during the polymerization.

In one embodiment in an optional step c), in particular where step b) was performed as a slurry process, the product medium obtained in step b) is contacted with an aqueous medium and removing at least partially the organic diluent and to the extent present in the medium removing at least partially the residual monomers and carbon dioxide to obtain an aqueous slurry comprising the isoolefin polymer in form of particles often referred to as rubber crumb. The contact can be performed in any vessel suitable for this purpose and be carried out batchwise or continuously, whereby a continuous process is preferred. In industry such contact is typically performed in a steam-stripper, a flash drum or any other vessel known for separation of a liquid phase and vapours.

Removal of organic diluent and optionally monomers may also employ other types of distillation so to subsequently or jointly remove the residual monomers and the organic diluent to the desired extent. Distillation processes to separate liquids of different boiling points are well known in the art and are described in, for example, the *Encyclopedia of Chemical Technology*, Kirk Othmer, 4th Edition, pp. 8-311, which is incorporated herein by reference. Generally, the unreacted monomers and the diluent may either be separately or jointly be recycled into step a) of the process according to the invention.

The pressure in optional step c) and in one embodiment the steam-stripper or flash drum depends on the organic diluent and monomers employed in step b). The temperature in optional step c) is selected to be sufficient to at least partially remove the organic diluent and to the extent still present residual monomers.

The organic diluent and/or the monomer(s) removed in step c) may be recycled into steps a) and or b) again.

In one embodiment the temperature is from 10 to 100° C., preferably from 50 to 100° C., more preferably from 60 to 95° C. and even more preferably from 75 to 95° C.

In case step b) was carried out as solution polymerization upon contact with water the organic diluent is evaporated and the isoolefin polymer forms discrete particles suspended in the aqueous slurry.

In a further optional step d) the isoolefin polymer contained in the aqueous slurry obtained according to step c) may be separated to obtain the isoolefin polymer. The separation may be effected by flotation, centrifugation, filtration, dewatering in a dewatering extruder or by any other means known to those skilled in the art for the separation of solids from fluids.

In a further optional step e) the isoolefin polymer particles obtained according to step d) are dried, preferably to a residual content of volatiles of 7,000 or less, preferably 5,000 or less, even more preferably 4,000 or less and in on other embodiment 2,000 ppm or less, preferably 1,000 ppm or less.

As used herein the term volatiles denotes compounds having a boiling point of below 250° C., preferably 200° C. or less at standard pressure and include water as well as remaining organic diluents.

Drying can be performed using conventional means known to those in the art, which includes drying on a heated mesh conveyor belt or in an extruder.

It was found that the process according to the invention allows unique process control via the continuous and thus highly reproducible preparation of the initiator system. This is in particular reflected by the high variability of polymer product parameters like Mooney viscosity, molecular weight and gel content obtained by purposive variations of the preparation conditions of the initiator system.

Experimental Section:

EXAMPLES

The experimental investigations were performed in a cooled two vessel cascade (Büchi, $V_R$ with a volume of 2l) equipped with wall scraping anchor agitators and a polymerization residence time of 10-28 min was used for all experiments. The fresh monomers (isobutene 99.91, Lyondell) and hexane (n-hexane 95% and technical grades) were dried using columns filled with 3A molecular sieve and inhibitor remover for isoprene. Feeds were cooled down before entering the reactors. The monomer-content of the mixed feed was around 60 wt. %. The polymer-content was limited to 15% resulting in a monomer monomer conversion of around 25-30%. The polymerizations were stopped by adding methanol as short stopper.

TABLE 1

Polymerizations using initiator systems according to the invention

| Ex. | Contact | Lewis Acid | Initiator | Residence time |
|---|---|---|---|---|
| 1 | in reactor | LA1 | water (100 ppm water hexane) | 0 |
| 2 | in reactor | LA1 | HCl (0.05M solution of HCl in hexane) | 0 |

TABLE 1-continued

Polymerizations using initiator systems according to the invention

| Ex. | Contact | Lewis Acid | Initiator | Residence time |
|---|---|---|---|---|
| 3 | pre-reactor | LA1 | HCl (0.05M solution of HCl in hexane) | 5 sec |
| 4 | pre-reactor | LA1 | HCl (0.05M solution of HCl in hexane) | 5 sec |
| 5 | pre-reactor | LA1 | water (100 ppm water hexane) | 2 min |
| 6 | pre-reactor | LA1 | water (100 ppm water hexane) | 2 min |
| 7 | pre-reactor | LA1 | water (100 ppm water hexane) | 20 min |
| 8 | pre-reactor | LA2 | water (100 ppm water hexane) | 2 min |
| 9 | pre-reactor | LA1 | water (wet nitrogen stream) | 5 min |

LA1: 0.2M(Al) solution of EASC in hexane, LA2: 0.2M(Al) solution of iBuAlSC in hexane.

Examples 1, 5 to 8: Water was added to hexane and the content determined by Karl-Fischer Titration.

Examples 2 to 4: Gaseous HCl was added to hexane and the content determined by elemental analysis.

Example 9: 90 g of 20 wt % EADC in hexane and 100 g of 17 wt % DEAC in hexane were diluted with 1,810 g hexane at 20° C. and ambient pressure. The resulting solution comprising EASC (0.2 M with respect to Al) is continuously pumped at a rate of 20 g/h to a stirred vessel where a stream of wet nitrogen gas (i.e. having a water partial pressure of 23 hPa and thus relative humidity of around 95% at 20° C.) is passed through it at a rate of 1.86 l/h (or 1.90 10 mmol of water/h). Thereby the aluminum compound (here EASC) is contacted with the initiator (here water).

The solution comprising the initiator system was then is transferred by an overflow to a separation bottle where an insoluble residue was removed. Then the solution was pumped into the reactor.

TABLE 2

Properties of butyl rubber obtained in examples 1 to 9

| Ex. | $M_w$ | Unsaturation | Gel-content [wt.-%] | Mooney viscosity |
|---|---|---|---|---|
| 1 | 273 kD | 1.52% | 0.60% | 13.3 |
| 2 | 229 kD | 1.52% | 0.38% | 14.2 |
| 3 | 318 kD | 1.60% | 0.24% | 21.7 |
| 4 | 352 kD | 1.52% | 0.58% | 27.5 |
| 5 | 449 kD | 1.69% | 1.27% | 41.2 |
| 6 | 488 kD | 1.83% | not tested | 38.2 |
| 7 | 822 kD | 1.99% | not tested | 70.7 |
| 8 | 420 kD | 2.00% | 0.35% | not tested |
| 9 | 450 kD | 1.90% | not tested | 36.5 |

NOTE:
The continuous initiator-make up using wet $N_2$ for activation showed very high activities of 1,000-4,500 g polymer/g Initiator.

What is claimed is:

1. A process for the preparation of isoolefin polymers, the process comprising at least the steps of:

a) providing a reaction medium to a reactor, the reaction medium comprising an organic diluent, and at least one monomer including an isoolefin;

b) separately providing to the reactor an initiator system prepared by contacting
　　at least one boron or aluminium compound and
　　at least one initiator;
and
c) polymerizing the at least one monomer within the reaction medium in the presence of the initiator system to form a product medium comprising the isoolefin polymer, the organic diluent and optionally residual monomer(s),
whereby the initiator system is formed by continuously contacting a first stream including at least one boron or aluminium compound and a second stream including at least one initiator;
wherein a residence time being the time between continuously contacting the aluminum or boron compound(s) with the initiator to form the initiator system and contacting said initiator system within the reaction medium with at least one monomer being an isoolefin is greater than 0 seconds.

2. The process according to claim 1, wherein the isoolefin are selected from those isoolefins having from 4 to 16 carbon atoms.

3. The process according to claim 2, wherein the isoolefin are selected from those isoolefins having 4 to 7 carbon atoms.

4. The process according to claim 1, wherein the isoolefin is isobutene.

5. The process according to claim 4, wherein the reaction medium comprises isobutene as sole monomer.

6. The process according to claim 1, wherein the reaction medium further comprises one or more multiolefins.

7. The process according to claim 6, wherein the one or more multiolefins includes isoprene.

8. The process according to claim 1, wherein the organic diluent is selected from hydrochlorocarbon(s), hydrofluorocarbons and alkanes.

9. The process according to claim 1, wherein the boron or aluminium compounds are those represented by formula $MX_3$, where M is boron or aluminum and X is a halogen or those represented by formula $MR_{(m)}X_{(3-m)}$, where M is boron or aluminum, X is a halogen, R is a monovalent hydrocarbon radical selected from the group consisting of $C_1$-$C_{12}$ alkyl and $C_7$-$C_{14}$ alkylaryl radicals; and and m is one or two, whereby the term "alkylaryl" refers to a radical containing both aliphatic and aromatic structures, the radical being at an aliphatic position.

10. The process according to claim 1, wherein the boron or aluminium compounds include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride, isobutyl aluminum dichloride and diisobutyl aluminum chloride.

11. The process according to claim 1, wherein the initiators are selected from the group consisting of water, alcohols, phenols, hydrogen halides, carboxylic acids, carboxylic acid halides, carboxylic acid esters, carboxylic acid amides, sulfonic acids, sulfonic acid halides, alkyl halides, alkylaryl halides and polymeric halides.

12. The process according to claim 11, wherein the initiators are selected from the group consisting of water, methanol, ethanol, hydrogen chloride, hydrogen bromide and 2-chloro-2-methylpropane.

13. The process according to claim 1, wherein the provision of the reaction medium and polymerization is carried out continuously.

14. The process according to claim 1, wherein step c) is carried out at a temperature in the range of −100° C. to −60° C.

15. The process according to claim 1, wherein the residence time is from 5 seconds to 20 minutes.

16. A process for the preparation of isoolefin polymers, the process comprising at least the steps of:
a) providing a reaction medium to a reactor, the reaction medium comprising an organic diluent, and at least one monomer including an isoolefin;
b) separately providing to the reactor an initiator system prepared by contacting
　　at least one boron or aluminium compound and
　　at least one initiator;
and
c) polymerizing the at least one monomer within the reaction medium in the presence of the initiator system to form a product medium comprising the isoolefin polymer, the organic diluent and optionally residual monomer(s),
whereby the initiator system is formed by continuously contacting a first stream including at least one boron or aluminium compound and a second stream including at least one initiator;
wherein the molar ratio of initiator to the sum of boron and aluminum atoms of the boron or aluminum compounds employed is from 0.500 to 1.900.

17. The process according to claim 16, wherein a residence time being the time between continuously contacting the aluminum or boron compound(s) with the initiator to form the initiator system and contacting said initiator system within the reaction medium with at least one monomer being an isoolefin is greater than 0 seconds.

18. The process according to claim 16, wherein the molar ratio of initiator to the sum of boron and aluminum atoms of the boron or aluminum compounds employed is from 0.900 to 1.050.

19. A method to control the product properties of isoolefin polymers prepared using an initiator system prepared by continuously contacting
a first stream including at least one boron or aluminium compound and
a second stream including at least one initiator by adjusting the residence time of the initiator system and/or
the molar ratio of the at least one boron or aluminium compound and at least one initiator employed to form the initiator system.

20. The method of claim 19, wherein the residence time is 5 seconds to 20 minutes.

* * * * *